United States Patent
Meeks

(10) Patent No.: US 7,293,951 B2
(45) Date of Patent: Nov. 13, 2007

(54) LIFTING APPARATUS AND METHOD

(76) Inventor: Paul Meeks, 604 Kimbrough Dr., Tallulah, LA (US) 71284

( * ) Notice: Subject to any disclaimer, the term of this patent is extended or adjusted under 35 U.S.C. 154(b) by 358 days.

(21) Appl. No.: 10/986,247

(22) Filed: Nov. 11, 2004

(65) Prior Publication Data

US 2006/0120841 A1 Jun. 8, 2006

(51) Int. Cl.
*B60P 1/14* (2006.01)
(52) U.S. Cl. .................... 414/462; 414/471; 414/547
(58) Field of Classification Search ............... 414/462, 414/471, 477, 547; 298/12
See application file for complete search history.

(56) References Cited

U.S. PATENT DOCUMENTS

| | | | |
|---|---|---|---|
| 2,338,955 A | | 1/1944 | Metcalf |
| 2,771,197 A | * | 11/1956 | Leffler .................... 212/256 |
| 3,480,166 A | * | 11/1969 | Abbott .................... 414/462 |
| 3,596,788 A | * | 8/1971 | Willie .................... 414/462 |
| 3,968,890 A | | 7/1976 | Robson |
| 3,982,643 A | | 9/1976 | MacGregor et al. |
| 4,687,402 A | * | 8/1987 | Zatylny .................... 414/24.6 |
| 4,813,841 A | * | 3/1989 | Eischen .................... 414/477 |
| 5,456,564 A | | 10/1995 | Bianchini |
| 5,505,579 A | * | 4/1996 | Ray et al. .................... 414/462 |
| 5,590,998 A | | 1/1997 | Wilcox |
| 5,911,556 A | | 6/1999 | Caldwell |
| 5,964,565 A | * | 10/1999 | Skotzky .................... 414/462 |
| 6,254,117 B1 | | 7/2001 | Cross |
| 6,435,801 B2 | * | 8/2002 | Talbott .................... 414/462 |
| 6,461,095 B1 | | 10/2002 | Puska |
| 6,530,738 B2 | | 3/2003 | Maxwell |
| 6,589,004 B2 | | 7/2003 | Reed |
| 6,607,345 B2 | | 8/2003 | McElhany |
| 6,609,481 B1 | | 8/2003 | McCarty |
| 6,638,001 B1 | | 10/2003 | McKinley |
| 6,659,566 B2 | | 12/2003 | Bombardier |
| 6,672,821 B1 | | 1/2004 | McClam, Jr. |
| 6,769,858 B1 | * | 8/2004 | Butler et al. .................... 414/462 |
| 6,869,265 B2 | * | 3/2005 | Smith et al. .................... 414/462 |

\* cited by examiner

*Primary Examiner*—James Keenan
(74) *Attorney, Agent, or Firm*—Haynes and Boone, LLP

(57) ABSTRACT

A lifting apparatus and method according to which a load is mounted to a structure. The structure is rotated about a pivot axis so that the load is positioned over an object while remaining mounted to the structure, and the load is translated towards the pivot axis during the rotation so that the radial distance between the load and the pivot axis is decreased during the rotation.

13 Claims, 6 Drawing Sheets

LIFTING APPARATUS AND METHOD

BACKGROUND

This invention relates in general to a lifting apparatus and in particular to a lifting apparatus suitable for connection to an object such as an all-terrain or other off-road vehicle.

After hunting and killing a game animal such as a deer, it is sometimes desired to lift the game animal from the ground surface to a rack on an off-road vehicle or an all-terrain vehicle (ATV), in order to transport the game animal to another location. Due to the game animal's size and weight, lifting with human effort may be difficult and/or cause personal injury. To facilitate lifting, a lifting apparatus may be connected to the ATV or off-road vehicle, and may be used to lift the game animal, or other load, up and onto and/or over the rack of the ATV or off-road vehicle.

However, the operation of a conventional lifting apparatus may raise several problems. The lifting apparatus may be large and bulky, protruding out from the ATV or off-road vehicle and restricting the ability of the vehicle to travel through horizontally and/or vertically tight spaces in indoor environments, such as warehouses or barns, or outdoor environments, such as farms or forests. Also, the lifting apparatus may require even more volumetric space during the lifting operation, thereby further limiting the environments in which the ATV or off-road vehicle, and the lifting apparatus, may operate. Another problem may be the degree of human effort required to position the game animal or other load onto the lifting apparatus. Also, the loading of the game animal onto the apparatus, and subsequently over the ATV or off-road vehicle, may adversely affect the stability and balance of the vehicle, and may cause the vehicle to tip over. Further, one or more components of the lifting apparatus may fail or experience a reduction in performance due to the forces required to lift the game animal or other load.

Therefore, what is needed is a lifting apparatus and method that overcomes one or more of the above-described problems, among others.

DETAILED DESCRIPTION

Figure 1:
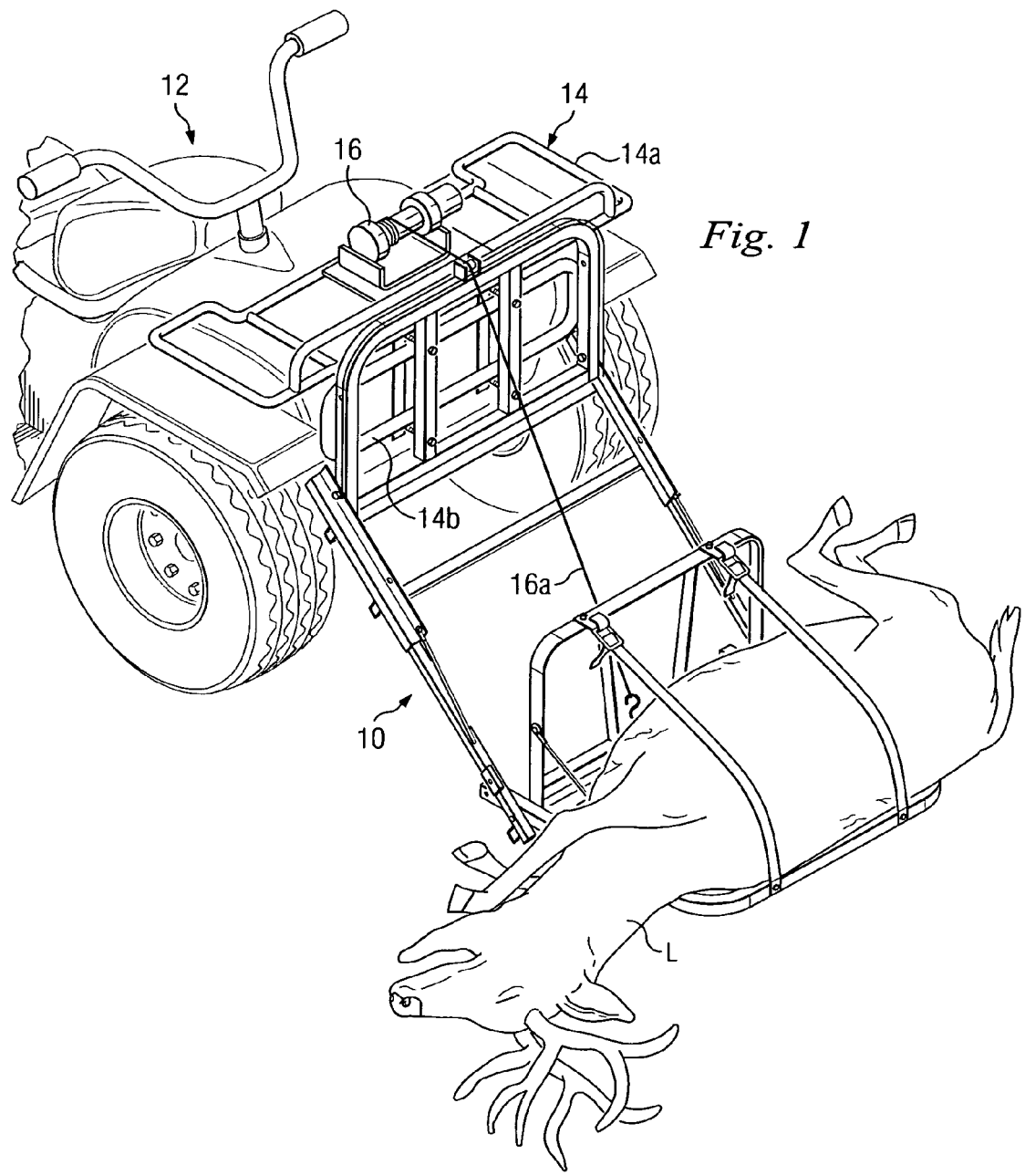
FIG. 1 is a perspective view of a lifting apparatus according to an embodiment of the present invention, with the lifting apparatus mounted to an all-terrain vehicle (ATV) and in receipt of a game animal.

Referring to FIG. 1, a lifting apparatus according to an embodiment of the present invention is generally referred to by the reference numeral 10 and is adapted to receive a game animal or other load L. The lifting apparatus 10 is mounted to an all-terrain vehicle (ATV) 12 having a rack 14. The ATV rack 14 is conventional and, as such, includes a horizontal frame component 14a and a vertical frame component 14b connected thereto and extending in front of the ATV 12. A conventional winch 16 having a winch lead line 16a is connected to the horizontal frame component 14a.

Figure 2:
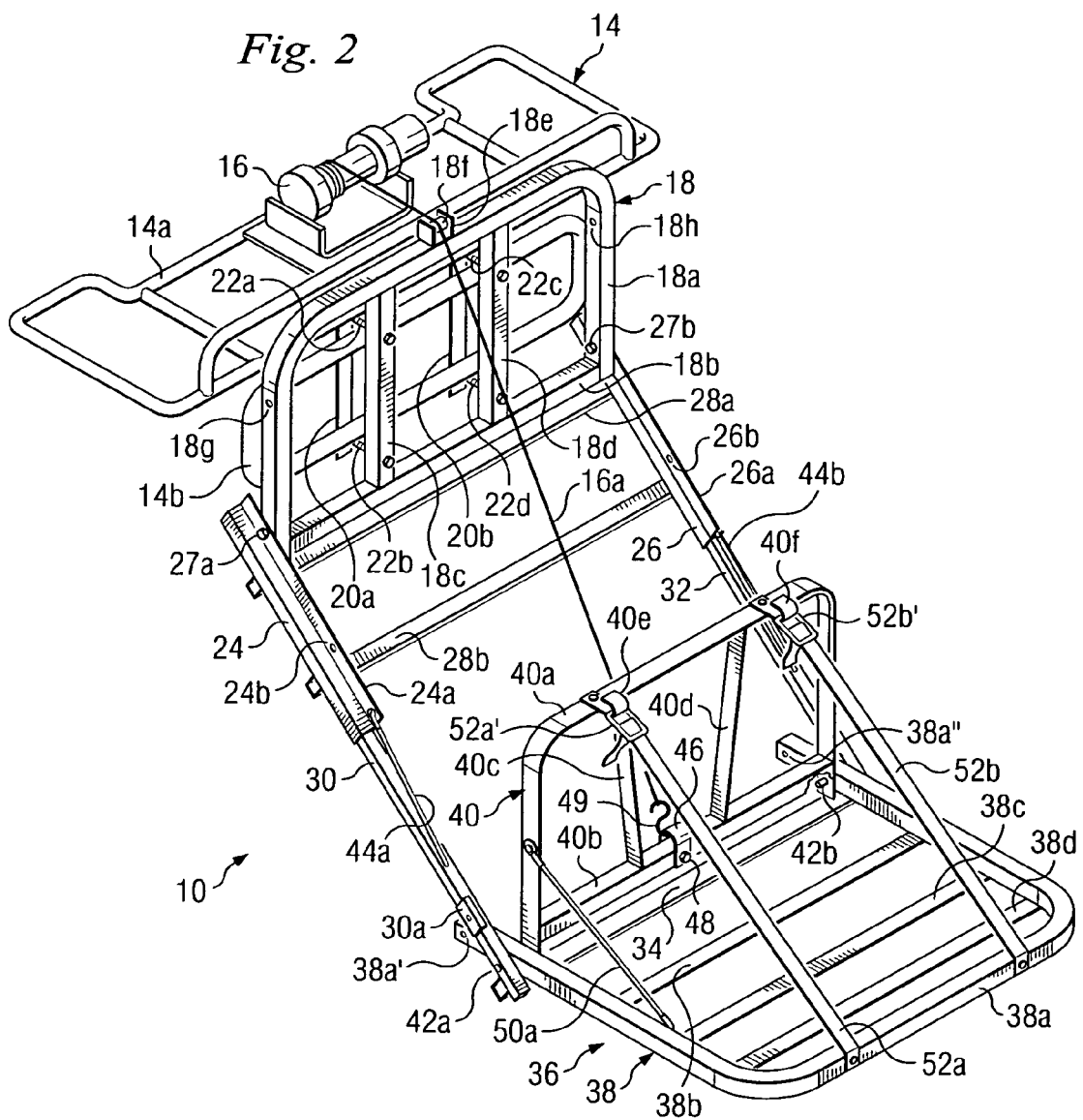
FIG. 2 is a front perspective view of the lifting apparatus of FIG. 1, but with the ATV and the game animal removed for clarity purposes.
Figure 3:
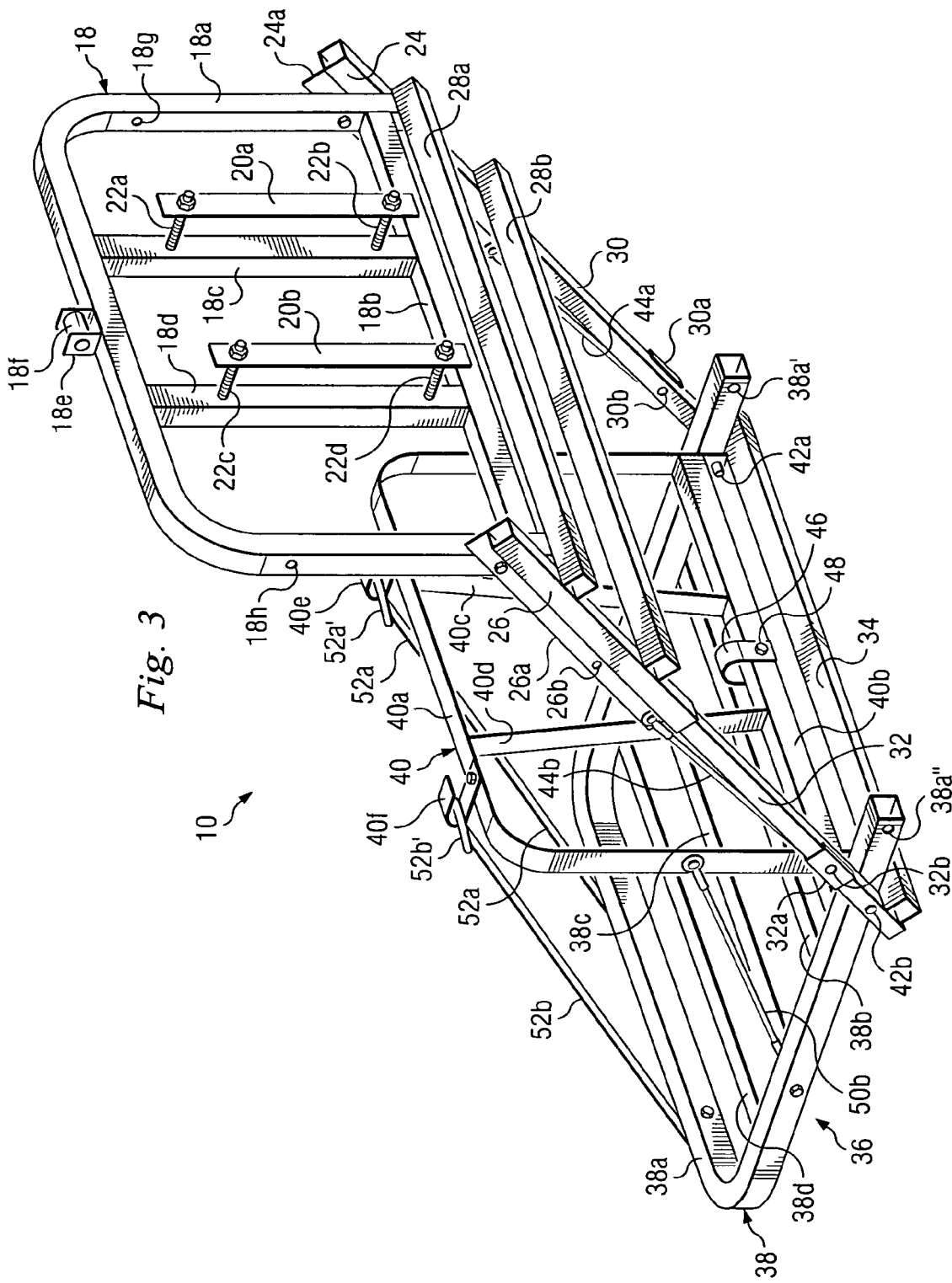
FIG. 3 is a rear perspective view of the lifting apparatus of FIG. 2.
Figure 4:
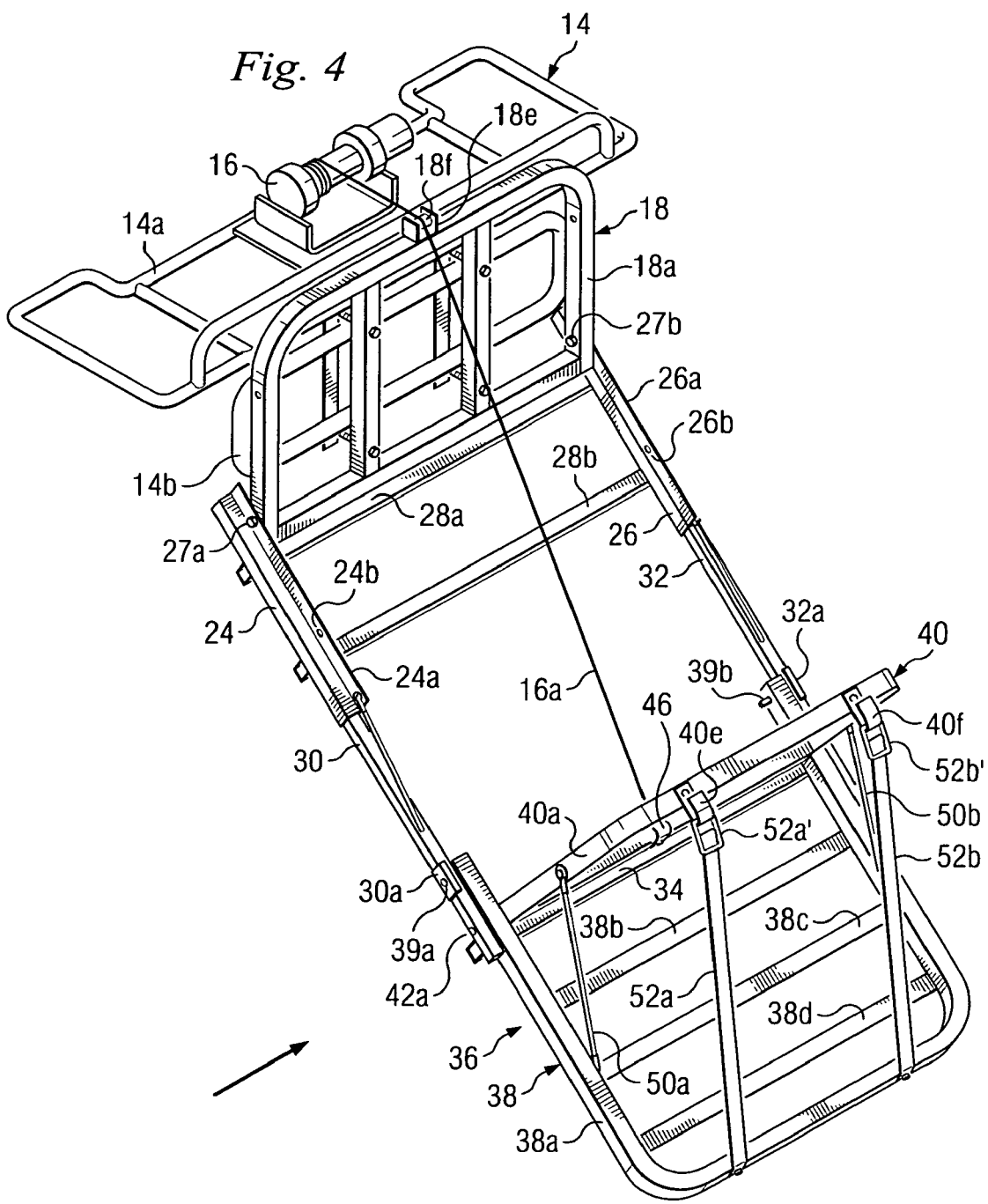
FIG. 4 is another perspective view of the lifting apparatus of FIG. 2 but depicting another operational mode.

Referring to FIGS. 2-4, with continuing reference to FIG. 1, the lifting apparatus 10 includes a frame 18 having a U-shaped member 18a and a horizontal member 18b extending therebetween. A pair of vertical members 18c and 18d extend from the horizontal member 18b to the upper portion of the U-shaped member 18a. A U-bracket 18e is connected to the upper portion of the U-shaped member 18a. A lead roller 18f is supported by the U-bracket 18e, and is positioned relative to the winch 16 so that the roller rotates in place as the winch lead line 16a engages the roller during the retraction and/or extension of the winch lead line, under conditions to be described. Axially-aligned holes 18g and 18h are formed through opposing sides of the U-shaped member 18a.

Attachment bars 20a and 20b are connected to the vertical members 18c and 18d, respectively, so that the attachment bars are in a spaced, parallel relation to the vertical members. Fasteners 22a-22b connect and extend between the vertical member 18c and the attachment bar 20a, and fasteners 22c-22d connect and extend between the vertical member 18d and the attachment bar 20b (FIG. 3). The frame 18 is connected to the frame component 14b of the ATV 12 so that the frame component 14b extends between the vertical members 18c-18d and the attachment bars 20a-20b, and between the fasteners 22a and 22b, and 22c and 22d, thereby connecting the lifting apparatus 10 to the ATV.

Sleeves 24 and 26 are pivotally connected to the opposing legs of the U-shaped member 18a, respectively. Flanges 24a and 26a extend along the longitudinal length of the sleeves 24 and 26, respectively. Fasteners 27a and 27b extend through the flanges 24a and 26a, respectively, and through the U-shaped member 18a, thereby forming the aforementioned pivot connections and defining a pivot axis. A pair of transversely-extending support members 28a and 28b connect the sleeves 24 and 26 together so that the sleeves are able to rotate in unison, relative to the frame 18 and the ATV 12, and about the pivot axis defined by the fasteners 27a and 27b. Holes 24b and 26b are formed through the flanges 24a and 26a, respectively, and are adapted to be axially aligned with the holes 18g and 18h, respectively, under conditions to be described, so that each pair of aligned holes may receive a pin assembly 29a or 29b (pin assemblies shown in FIG. 5).

Telescoping arms 30 and 32 are telescopingly engaged with the sleeves 24 and 26, respectively, so that each telescoping arm is at least partially inserted in the corresponding sleeve, and is adapted to telescope in and out of the sleeve. U-shaped brackets 30a and 32a are clamped around and connected to the telescoping arms 30 and 32, respectively. A bore 30b is formed through the bracket 30a and the telescoping arm 30. Likewise, a bore 32b is formed through the bracket 32a and the telescoping arm 32. A transversely-extending support member 34 connects the telescoping arms 30 and 32 together so that the telescoping arms are able to telescope, in unison, in and out of the sleeves 24 and 26, respectively.

A structure or scoop (or cradle) assembly 36, is pivotally connected to the distal end portions of the telescoping arms 30 and 32, and includes a cradle or load rack 38 that is pivotally connected to a travel rack 40. A pin 42a extends through the telescoping arm 30, the load rack 38 and the travel rack 40, and a pin 42b extends through the telescoping arm 32, the load rack 38 and the travel rack 40. The pins 42a and 42b define a pivot axis and form the aforementioned pivot connections between the telescoping arms 30 and 32 and the scoop assembly 36, and between the load rack 38 and the travel rack 40 of the scoop assembly. Tethers 44a and 44b extend from the flanges 24a and 26a, respectively, and are connected to the pins 42a and 42b, respectively.

The load rack 38 includes a U-shaped member 38a and transversely-extending support members 38b, 38c and 38d extending between the opposing legs of the U-shaped member 38a. A bore 38a' is formed through one of the opposing legs of the U-shaped member 38a, and a bore 38a" is formed through the other of the opposing legs so that the bores are axially aligned. The bores 38a' and 38a" are adapted to be axially aligned with the bores 30b and 32b, respectively, under conditions to be described, so that each bore-and-hole alignment may receive a pin 39a or 39b (pins shown in FIG. 4).

The travel rack 40 includes a U-shaped member 40a and a transversely-extending support member 40b extending between the opposing legs of the U-shaped member 40a. A pair of support members 40c and 40d extend between the support member 40b and the transversely-extending portion of the U-shaped member 40a. A pair of J-hook brackets 40e and 40f are connected to the transversely-extending portion of the U-shaped member 40a so that the distal portion of each J-hook bracket curves back to and is parallel with the top surface of the transversely-extending portion of the U-shaped member 40a.

A U-shaped bracket 46 is connected to the support member 40b via a fastener 48 so that the support member 40b extends between the opposing sides of the U-shaped bracket 46. The distal end of the winch lead line 16a is removably connected to the U-shaped bracket 46 in any conventional manner such as, for example, with a hook 49. A tether 50a extends between the U-shaped members 38a and 40a on the side of the scoop assembly 36 proximate to the telescoping arm 30. Similarly, a tether 50b extends between the U-shaped members 38a and 40a on the side of the scoop assembly 36 proximate to the telescoping arm 32.

A pair of adjustable straps 52a and 52b extend between the transversely-extending portions of the U-shaped members 38a and 40a, and include rectangular brackets 52a' and 52b', respectively. The straps 52a and 52b are fastened to the transversely-extending portion of the U-shaped member 38a. The brackets 52a' and 52b' are looped over the j-hook brackets 40e and 40f, respectively, thereby connecting the straps 52a and 52b to the U-shaped member 40a. The adjustable straps 52a and 52b are conventional and, as such, include means for adjusting the tension in the strap. For example, the tension-adjusting means may include an insert hingedly connected to the bracket 52a' or 52b'. Each insert may include spring-loaded teeth that are biased against the strap 52a or 52b to hold the strap against the bracket 52a' or 52b', thereby maintaining the tension in the strap. The teeth may be spring loaded by, for example, a torsion spring through which the hinge in the hinged connection between the insert and the bracket 52a' or 52b' extends.

In operation, the lifting apparatus 10 is configured as shown in FIGS. 1 and 2. The ATV 12 is positioned as desired, the telescoping arms 30 and 32 are extended so that the support member 34 contacts the ground surface, and the winch lead line 16a is accordingly extended. The load rack 38 of the scoop assembly 36 is pivoted so that the U-shaped member 38a is substantially horizontal and contacts the ground surface. The travel rack 40 is pivoted so that the U-shaped member 40a of the travel rack 40 is substantially perpendicular to the U-shaped member 38a of the load rack 38. The tethers 50a and 50b prevent the travel rack 40 from pivoting past 90 degrees relative to the load rack 38.

A game animal is positioned onto the load rack 38. The substantially horizontal orientation and the contact of the U-shaped member 38a with the ground surface facilitates the positioning of the game animal onto the load rack 38. For example, the game animal may easily be rolled or slid onto the load rack 38 from an initial position on the ground surface because the game animal only has to be rolled or slid over the vertical dimension of the U-shaped member 38a.

The U-shaped member 38a, and the support members 38b, 38c and 38d, primarily support the game animal as it is positioned and rests on the load rack 38. It is understood that further positioning of the game animal in a direction towards the travel rack 40 may cause the game animal to engage the tethers 50a and 50b, thereby resulting in the travel rack 40 rotating (or pivoting) towards the load rack 38. This effect may be desired to assist in securing the game animal to the scoop assembly 36.

After the game animal is positioned on the load rack 38 as desired, the adjustable straps 52a and 52b are extended over the game animal and the brackets 52a' and 52b' are looped over the j-hook brackets 40e and 40f, respectively. Using the inserts connected to each of the brackets 52a' and 52b', tension may be applied to and held in the straps 52a and 52b so that the game animal is secured to the scoop assembly 36.

Referring to FIG. 4, with continuing reference to FIGS. 1-3, the winch 16 is operated in a conventional manner so that the winch lead line 16a retracts towards the ATV rack 14. The lead roller 18f rotates in place as the winch lead line 16a engages the roller during retraction. Due to the connection between the winch lead line 16a and the U-shaped bracket 46, the support member 40b is raised and pulled towards the ATV 12 while the transversely-extending portion of the U-shaped member 38a is pushed against the ground surface due to the weight of the game animal. As a result, the load rack 38 pivots about the pins 42a and 42b, rotating in a clockwise direction as viewed from the direction of the arrow in FIG. 4 and relative to the arms 30 and 32.

During this time, the sleeves 24 and 26, and the telescoping arms 30 and 32, pivot about the fasteners 27a and 27b, rotating in a counterclockwise direction as viewed from the direction of the arrow in FIG. 4. Further, the telescoping arms 30 and 32 begin to retract and telescope into the sleeves 24 and 26, respectively, thereby decreasing the radial distance between the scoop assembly 36 and the pivot axis defined by the fasteners 27a and 27b.

The pivoting of the load rack 38 about the pins 42a and 42b in a clockwise direction, as viewed from the direction of the arrow in FIG. 4 and relative to the arms 30 and 32, continues until opposing legs of the U-shaped member 38a contact the support member 34, preventing further rotation. At this point, the opposing legs of the U-shaped member 38a are substantially coplanar with the telescoping arms 30 and 32, as shown in FIG. 4. Further, the holes 38a' and 38a" are substantially axially aligned with the bores 30b and 32b, respectively. The pin 39a may be inserted through the bore 38a' and the bore 30b axially aligned thereto. Likewise, the pin 39b may be inserted through the bore 38a" and the bore 32b axially aligned thereto. Thus, any pivoting of the load rack 38 relative to the telescoping arms 30 and 32, or vice versa, is prevented.

If the pins 39a and 39b are not so inserted, the scoop assembly is able to pivot or rotate counterclockwise, as viewed from the direction of the arrow in FIG. 4 and relative to the telescoping arms 30 and 32. However, notwithstanding the absence of the pins 39a and 39b, the support member 34 prevents the scoop assembly 36 from rotating clockwise, as viewed from the direction of the arrow in FIG. 4 and relative to the telescoping arms 30 and 32.

It is understood that the pins 39a and 39b may be held captive or secured in any conventional manner such as by, for example, pivotally connecting a flexible square-shaped band to the head of each pin and hooking the band around the U-shaped member 38a and the telescoping arm 30 or 32, and on to the end of the pin 39a or 39b, as shown in FIG. 4. It is further understood that the adjustable straps 52a and 52b prevent the game animal from sliding off of the load rack 38, which is now appreciably angled towards the ground surface.

The winch 16 continues to operate, retracting the winch lead line 16a towards the ATV rack 14. Accordingly, the telescoping arms 30 and 32 continue to telescope into the sleeves 24 and 26, respectively, and the sleeves continue to rotate in a counterclockwise direction about the fasteners 27a and 27b, respectively. As a result, the game animal rotates about and translates towards the pivot axis defined by the fasteners 27a and 27b, and therefore closer to the ATV rack 14, instead of just rotating about the fasteners 27a and 27b at a constant radial distance therefrom. Thus, the scoop assembly 36, and the game animal mounted thereto, moves towards the ATV rack 14 in a controlled and compact manner. Further, the forces applied to the winch 16 are decreased due to the translation of the game animal towards the pivot axis defined by the fasteners 27a and 27b. That is, by reducing the distance between the game animal and the pivot axis defined by the fasteners 27a and 27b, the moment created by the game animal about the winch 16 is also reduced, along with a corresponding reduction in the associated loading on the winch 16, thereby decreasing the risk of failure in the winch 16 and increasing the operable life of the winch 16.

The telescoping arm 30 continues to telescope into the sleeve 24 until an end of the bracket 30a contacts the distal end of the sleeve 24. Simultaneously, the telescoping arm 32 continues to telescope into the sleeve 26 until an end of the bracket 32a contacts the distal end of the sleeve 26. The U-shaped ends of the brackets 30a and 32a promote contact with the sleeves 24 and 26, respectively.

Although further telescoping of the telescoping arms 30 and 32 is prevented, the sleeves 24 and 26 may continue to rotate in a counterclockwise direction about the fasteners 27a and 27b, respectively, as the winch 16 continues to operate and retract the winch lead line 16a towards the ATV rack 14. As a result, the scoop assembly 36 also rotates about the fasteners 27a and 27b in a counterclockwise direction (as viewed from the direction of the arrow in FIG. 4).

Figure 5:
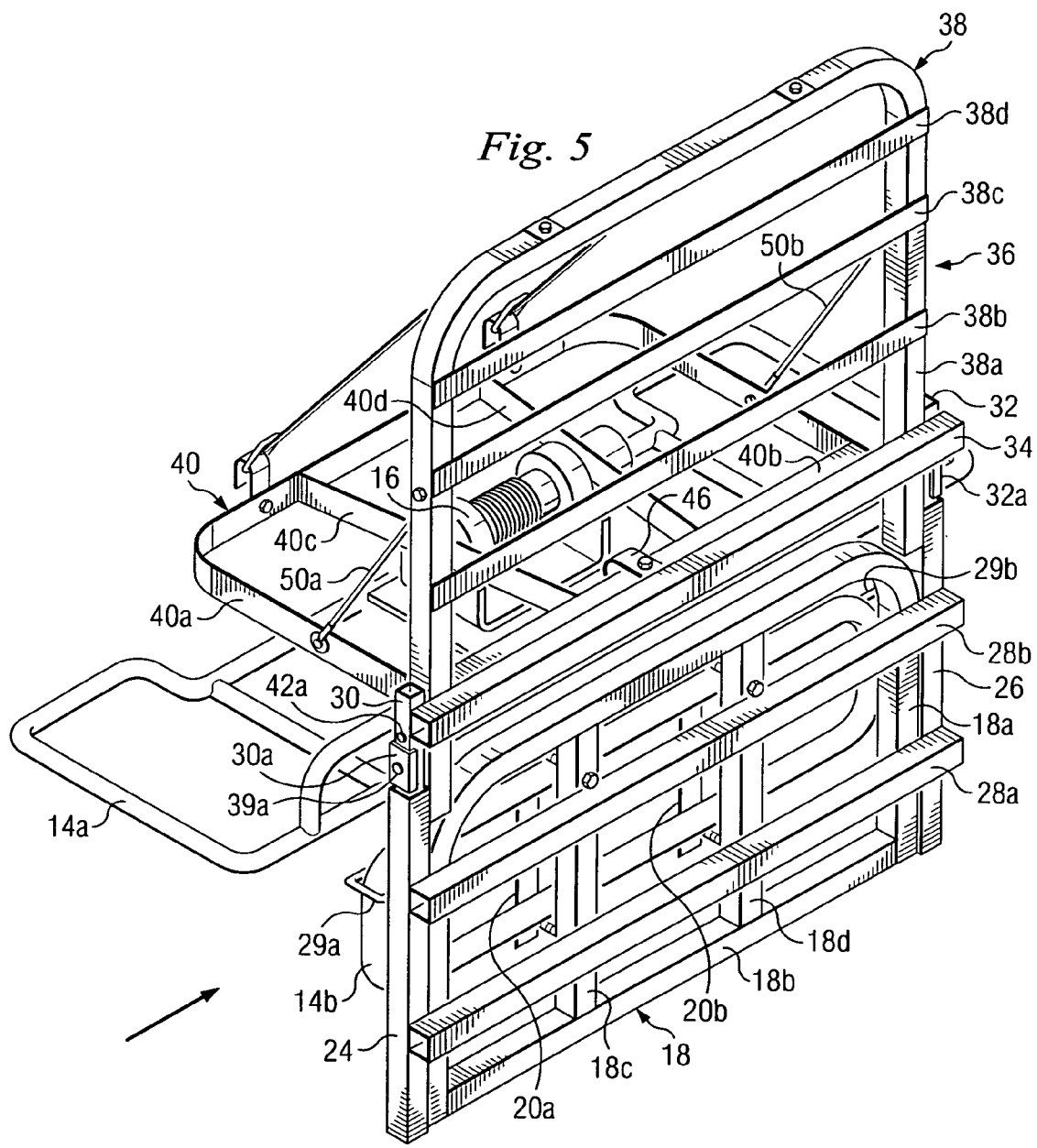
FIG. 5 is another perspective view of the lifting apparatus of FIG. 2 but depicting yet another operational mode.

Referring to FIG. 5, with continuing reference to FIGS. 1-4, the winch 16 continues to operate and the scoop assembly 36 continues to rotate, about the pivot axis defined by the fasteners 27a and 27b, until the sleeves 24 and 26 and the load rack 38 are substantially vertical, and the travel rack 40 is substantially horizontal. In this condition, the support member 28b contacts the vertical members 18c and 18d, and the frame 18 substantially fits within a volumetric envelope defined by the sleeves 24 and 26 and the support members 28a and 28b. Also, the game animal now rests on and is primarily supported by the travel rack 40, instead of by the load rack 38. Since the travel rack 40 is positioned over the ATV 12, the game animal is also positioned over the ATV 12, thereby maintaining stability and balance.

The travel rack 40 is prevented from rotating counterclockwise, as viewed from the direction of the arrow in FIG. 5, by the tethers 50a and 50b which, in turn, are supported by the substantially vertical load rack 38. The pins 39a and 39b prevent the load rack 38 from rotating counterclockwise towards the ATV rack 14. It is understood that, if the pins 39a and 39b are not present in the lifting apparatus 10, the travel rack 40 and the load rack 38 can rotate towards the ATV rack 14 until the travel rack is at least partially supported by the horizontal frame component 14a of the ATV rack.

The holes 24b and 26b are axially aligned with the holes 18g and 18h, respectively. The pin of the pin assembly 29a is inserted through the axially-aligned holes 24b and 18g. Likewise, the pin of the pin assembly 29b is inserted through the axially-aligned holes 26b and 18h. Thus, any pivoting of the sleeves 24 and 26, and the accompanying pivoting of the telescoping arms 30 and 32 and the scoop assembly 36, relative to the frame 18 is prevented. It is understood that the pins of the pin assemblies 29a and 29b may be secured, or made captive, in any conventional manner such as, for example, by pivotally connecting a square-shaped band to the head of each pin and hooking the band around the U-shaped member 18a and the flange 24a or 26a, and on to the end of the pin 29a or 29b, as shown in FIG. 5.

While resting on the travel rack 40, the game animal is transported to a desired location using the ATV 12. The position of the game animal over the ATV 12 serves to maintain the ATV's stability and balance during motion. As shown in FIG. 1, the lifting apparatus 10 does not protrude from either side of the ATV 12, having an overall width that is less than the width of the horizontal frame component 14a. Further, the vertical position of the transversely-extending portion of the U-shaped member 38a, as shown in FIG. 5 and relative to the ground surface, defines the limit of the extension of the lifting apparatus 10 in an upward direction. Thus, with the game animal in place for transportation, the lifting apparatus 10 does not significantly impede the ability of the ATV 12 to travel through horizontally and/or vertically tight spaces in indoor and outdoor environments.

The game animal may be removed from the lifting apparatus 10 by performing the above-described operation in reverse. It is understood that the rotation of the scoop assembly 36 in a clockwise direction, as viewed in the direction of the arrow of FIG. 4, or the rotation of the scoop assembly 36 and the telescoping of the telescoping arms 30 and 32 out of the sleeves 24 and 26, respectively, may be stopped at any desired position before the scoop assembly contacts the ground surface. For example, rotation of the scoop assembly 36 may be stopped at a position corresponding to the top surface of a table. The load rack 38 may rest against the top surface of the table and the game animal may be rolled or pushed off of the load rack and onto the table.

Figure 6:
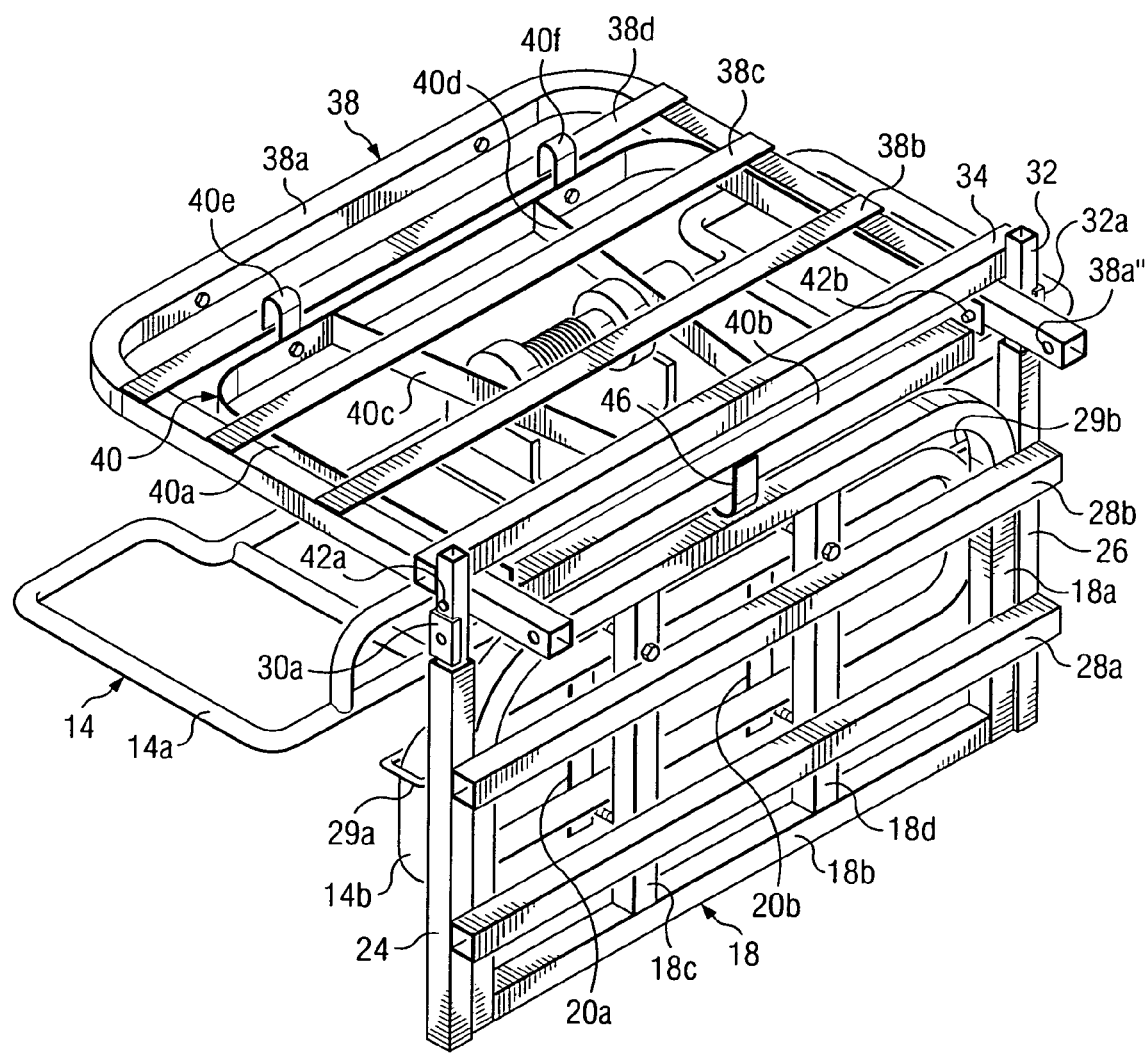
FIG. 6 is another perspective view of the lifting apparatus of FIG. 2 but depicting yet another operational mode.

Referring to FIG. 6, after the game animal has been unloaded, the above-described operation may be repeated so that the sleeves 24 and 26 are again substantially vertical, and the frame 18 substantially fits within the volumetric envelope defined by the sleeves and the support members 28a and 28b. The pins 39a and 39b may be removed from the lifting apparatus 10. The load rack 38 may then be rotated counterclockwise, as viewed in the direction of the arrow in FIG. 6, so that one or more of the support members 38b, 38c and 38d contact the U-shaped member 40a of the travel rack 40. In this condition, the U-shaped member 40a is surrounded by the U-shaped member 38a, and the travel rack 40 substantially fits within the volumetric envelope of the load rack 38.

It is understood that the fitting of the frame 18 within a volumetric envelope defined by the sleeves 24 and 26 and the support members 28a and 28b, and the substantial fitting of the travel rack 40 within the volumetric envelope of the load rack 38, contributes to the overall compactness of the lifting apparatus 10 when the scoop assembly 36 is in its unloaded configuration. That is, when the scoop assembly 36 is not being used to support and/or transport the game animal or other load.

VARIATIONS

It is understood that variations may be made in the foregoing without departing from the scope of the disclosure. For example, instead of being connected to the horizontal frame component 14a, the winch 16 may be connected to the ATV 12 at any other location on or within the ATV 12, and/or to any other component which in turn is connected to the ATV 12. Also, the lifting apparatus 10 may be connected to any type of static or moveable object. Exemplary static objects include walls, fences or loading docks, and exemplary moveable objects include trailers, wagons, off-road vehicles or other vehicles, such as cars or trucks. It is understood that the winch 16 may be in the form of a manual winch, an electronic winch or any other type of winch, and may be connected to or positioned near the static or moveable object to which the lifting apparatus 10 is connected. Also, instead of game animals, the lifting apparatus 10 may be used to lift and transport other loads such as bales of hay, lumber or boxes.

Further, a bore may be formed through each sleeve 24 and 26, and a corresponding bore may be formed through each telescoping arm 30 and 32 so that the bores are axially aligned after the telescoping has taken place. Pins may be inserted through these axially-aligned bores to prevent the telescoping arms 30 and 32 from further telescoping in or out of the sleeves 24 and 26, respectively, thereby locking the telescoping arms in place.

Still further, and as discussed above, the pin assemblies 29a and 29b, and the pins 39a and 39b, may be removed from the lifting apparatus 10. In the case of absent pin assemblies 29a and 29b, the weight of the game animal or other load may be used to prevent the sleeves 24 and 26 from rotating away from the frame 18. In the case of absent pins 39a and 39b, the load rack 38 is free to rotate counterclockwise, as viewed in the direction of the arrow in FIG. 4.

Still further, the U-shaped brackets 30a and 32a may be removed from the telescoping arms 30 and 32, respectively, and instead the distal end portions of the telescoping arms 30 and 32 may be disposed in sleeves in a non-telescoping, permanent arrangement. The pins 39a and 39b, and the pins 42a and 42b, may extend through these sleeves. The sleeves may terminate at a point along each telescoping arm 30 and 32 corresponding to the former termination of each U-shaped bracket 30a and 32a, relative to the distal end of each sleeve 24 and 26, respectively. In operation, the telescoping arms 30 and 32 may telescope into the sleeves 24 and 26, respectively, as described above, until the ends of the additional sleeves at the distal end portions of the telescoping arms 30 and 32 contact the ends of the sleeves 24 and 26, respectively, thereby preventing further telescoping into the sleeves 24 and 26.

Still further, the frame 18, the load rack 38 and/or the travel rack 40 may be modified and/or may be in the form of any type of component or element, including a single support member. Instead of using the load rack 38 and the travel rack 40, the scoop assembly 36 may be modified and/or may be in the form of any type of structure, including a single-member structure.

Any foregoing spatial references, such as "upper," "lower," "above," "below," "between," "vertical," "angular," etc., are for the purpose of illustration only and do not limit the specific orientation or location of the structure described above.

Although an exemplary embodiment of this invention has been described in detail above, those skilled in the art will readily appreciate that many other modifications are possible in the exemplary embodiment without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents, but also equivalent structures.

What is claimed is:

1. Apparatus for lifting a load, the apparatus comprising:
a structure to which the load is adapted to be mounted, the structure comprising a first rack and a second rack pivotally connected to the first rack; and
means for rotating the structure about a first pivot axis when the load is mounted to the structure so that the load is positioned over an object while remaining mounted to the structure and translating the structure towards the pivot axis during the rotation so that the radial distance between the load and the first pivot axis decreases during the rotation, the means comprising:
  a pair of sleeves spaced in a parallel relation and configured to rotate about the first pivot axis, the first pivot axis passing through the sleeves; and
  a pair of arms telescopingly engaged with respective ones of the sleeves and connected to the structure, wherein each arm telescopingly retracts into the corresponding sleeve to effect the translation;
wherein the first rack of the structure extends between and is pivotally connected to the distal end portions of the arms, the pivot connections between the first rack and the distal end portions of the arms defining a second pivot axis;
wherein the second rack of the structure is pivotally connected to the first rack along the second pivot axis;
wherein the first rack rotates about the second pivot axis and relative to the arms during the rotation of the structure about the first pivot axis, the first rack rotating until at least a portion of the first rack is substantially coplanar with at least a portion of each arm;
wherein, when the load is mounted to the structure, the load is primarily supported by the first rack prior to the rotation of the structure about the first pivot axis; and
wherein, when the load is mounted to the structure, the load is primarily supported by the second rack after the rotation of the structure about the first pivot axis and when the load is positioned over the object.

2. The apparatus of claim 1 wherein the structure has an unloaded configuration in which:
the second rack is positioned over the object; and
the first rack is positioned over the second rack so that the second rack substantially fits within a volumetric envelope defined by the first rack.

3. The apparatus of claim 1 further comprising:
a frame adapted to be connected to the object;
wherein each sleeve is pivotally connected to the frame; and
wherein the pivot connections between the frame and the sleeves define the first pivot axis.

4. The apparatus of claim 1 wherein the means further comprises:
a winch adapted to be connected to the object; and
a winch lead line extending from the winch and removably connected to the structure.

5. The apparatus of claim 4 wherein the winch lead line is removably connected to the second rack of the structure.

6. The apparatus of claim 5 wherein the object is an all-terrain vehicle.

7. Apparatus for lifting a load over an object, the apparatus comprising:
a pair of sleeves spaced in a parallel relation wherein corresponding end portions of the sleeves define a first pivot axis;
a pair of arms telescopingly engaged with respective ones of the sleeves; and
a structure to which the load is adapted to be mounted, the structure adapted to rotate about the first pivot axis and comprising:
a first rack extending between and pivotally connected to the arms to define a second pivot axis about which the first rack rotates during the rotation of the structure about the first pivot axis, the first rack rotating until at least a portion of the first rack is substantially coplanar with at least a portion of each arm; and
a second rack pivotally connected to the first rack along the second pivot axis;
wherein, when the load is mounted to the structure, the structure rotates about the first pivot axis so that the load is positioned over the object while remaining mounted to the structure;
wherein, when the load is mounted to the structure, the arms telescopingly retract into the corresponding sleeves during the rotation of the structure about the first pivot axis so that the radial distance between the load and the first pivot axis is decreased during the rotation about the first pivot axis;
wherein, when the load is mounted to the structure, the load is primarily supported by the first rack prior to the rotation of the structure about the first pivot axis; and
wherein, when the load is mounted to the structure, the load is primarily supported by the second rack after the rotation of the structure about the first pivot axis and when the load is positioned over the object.

8. The apparatus of claim 7 further comprising:
a winch adapted to be connected to the object; and
a winch lead line extending from the winch and connected to the structure.

9. Apparatus for lifting a load over an object, the apparatus comprising:
a pair of sleeves spaced in a parallel relation wherein corresponding end portions of the sleeves define a first pivot axis;
a pair of arms telescopingly engaged with respective ones of the sleeves; and
a structure to which the load is adapted to be mounted, the structure adapted to rotate about the first pivot axis and comprising:
a first rack extending between and pivotally connected to the arms to define a second pivot axis about which the first rack rotates during the rotation of the structure about the first pivot axis, the first rack rotating until at least a portion of the first rack is substantially coplanar with at least a portion of each arm; and
a second rack pivotally connected to the first rack along the second pivot axis;
wherein, when the load is mounted to the structure, the structure rotates about the first pivot axis so that the load is positioned over the object while remaining mounted to the structure;
wherein, when the load is mounted to the structure, the arms telescopingly retract into the corresponding sleeves during the rotation of the structure about the first pivot axis so that the radial distance between the load and the first pivot axis is decreased during the rotation about the first pivot axis; and
wherein the structure has an unloaded configuration in which:
the second rack is positioned over the object; and
the first rack is positioned over the second rack so that the second rack substantially fits within a volumetric envelope defined by the first rack.

10. The apparatus of claim 9 further comprising:
a winch adapted to be connected to the object; and
a winch lead line extending from the winch and connected to the structure.

11. A method of lifting a load, the method comprising:
mounting the load to a structure connected to an object;
rotating the structure about a first pivot axis in a first direction so that the load is positioned over the object while remaining mounted to the structure; and
translating the structure towards the first pivot axis during the rotation so that the radial distance between the load and the pivot axis decreases during the rotation;
wherein the step of rotating the structure about the first pivot axis in the first direction so that the load is positioned over the object while remaining mounted to the structure comprises:
pivotally connecting a pair of parallel-spaced arms to the structure;
connecting a winch lead line to the structure; and
retracting the winch lead line so that the arms rotate about the first pivot axis in the first direction;
wherein the step of translating the structure towards the first pivot axis during the rotation so that the radial distance between the load and the pivot axis decreases during the rotation comprises:
telescopingly engaging a sleeve with each arm wherein the first pivot axis passes through the sleeves; and
telescopingly retracting the arms into the corresponding sleeves by continuing the step of retracting the winch lead line;
wherein the pivot connections between the structure and the arms define a second pivot axis; and
wherein the method further comprises:
rotating at least a portion of the structure, while the load is mounted to the structure, about the second pivot axis and relative to the arms in a second direction by continuing the step of retracting the winch lead line, the second direction being opposite to the first direction; and
preventing further rotation of the portion of the structure, while the load is mounted to the structure, in the second direction about the second pivot axis when the portion is substantially coplanar with at least a portion of each arm.

12. The method of claim 11 wherein the object is an all-terrain vehicle; and
wherein the winch lead line extends from a winch connected to the all-terrain vehicle.

13. A system for lifting a load, the system comprising:
means for mounting the load to a structure connected to an object;

means for rotating the structure about a first pivot axis in a first direction so that the load is positioned over the object while remaining mounted to the structure; and means for translating the structure towards the first pivot axis during the rotation so that the radial distance between the load and the pivot axis decreases during the rotation;

wherein the means for rotating the structure about the first pivot axis in the first direction so that the load is positioned over the object while remaining mounted to the structure comprises:

means for pivotally connecting a pair of parallel-spaced arms to the structure;

means for connecting a winch lead line to the structure; and means for retracting the winch lead line so that the arms rotate about the first pivot axis in the first direction;

wherein the means for translating the structure towards the first pivot axis during the rotation so that the radial distance between the load and the pivot axis decreases during the rotation comprises:

means for telescopingly engaging a sleeve with each arm wherein the first pivot axis passes through the sleeves; and means for telescopingly retracting the arms into the corresponding sleeves by retracting the winch lead line;

wherein the pivot connections between the structure and the arms define a second pivot axis; and wherein the system further comprises:

means for rotating at least a portion of the structure, while the load is mounted to the structure, about the second pivot axis and relative to the arms in a second direction by continuing the step of retracting the winch lead line, the second direction being opposite to the first direction; and means for preventing further rotation of the portion of the structure, while the load is mounted to the structure, in the second direction about the second pivot axis when the portion is substantially coplanar with at least a portion of each arm.

* * * * *